(12) United States Patent
Ellsworth et al.

(10) Patent No.: US 9,232,055 B2
(45) Date of Patent: Jan. 5, 2016

(54) SIP PRESENCE BASED NOTIFICATIONS

(75) Inventors: Matthew R. Ellsworth, Erie, CO (US); Jason H. Vick, Pine, CO (US)

(73) Assignee: Avaya Inc., Basking Ridge, NJ (US)

( * ) Notice: Subject to any disclaimer, the term of this patent is extended or adjusted under 35 U.S.C. 154(b) by 1664 days.

(21) Appl. No.: 12/342,484

(22) Filed: Dec. 23, 2008

(65) Prior Publication Data

US 2010/0157980 A1    Jun. 24, 2010

(51) Int. Cl.
*H04M 3/42* (2006.01)
*H04L 29/06* (2006.01)
*H04L 29/08* (2006.01)

(52) U.S. Cl.
CPC ....... *H04M 3/42365* (2013.01); *H04L 65/1006* (2013.01); *H04L 67/24* (2013.01)

(58) Field of Classification Search
USPC ........................................ 370/352; 379/201.1
See application file for complete search history.

(56) References Cited

U.S. PATENT DOCUMENTS

| | | |
|---|---|---|
| 515,426 A | 2/1894 | French et al. |
| 4,074,069 A | 2/1978 | Tokura et al. |
| 4,275,385 A | 6/1981 | White |
| 5,206,903 A | 4/1993 | Kohler et al. |
| 5,315,434 A | 5/1994 | Mizuno et al. |
| 5,555,376 A | 9/1996 | Theimer et al. |
| 5,621,458 A | 4/1997 | Mann et al. |
| 5,627,375 A | 5/1997 | Hsieh |
| 5,680,450 A | 10/1997 | Dent et al. |
| 5,689,548 A | 11/1997 | Maupin et al. |
| 5,742,666 A | 4/1998 | Alpert |
| 5,793,861 A | 8/1998 | Haigh |
| 5,805,999 A | 9/1998 | Inoue |
| 5,828,747 A | 10/1998 | Fisher et al. |
| 5,905,659 A | 5/1999 | Rose |
| 5,905,793 A | 5/1999 | Flockhart et al. |
| 5,960,061 A | 9/1999 | Fahie et al. |
| 5,982,873 A | 11/1999 | Flockhart et al. |
| 6,067,017 A | 5/2000 | Stewart et al. |
| 6,076,121 A | 6/2000 | Levine |

(Continued)

FOREIGN PATENT DOCUMENTS

| | | |
|---|---|---|
| EP | 0899673 | 3/1999 |
| EP | 0998108 | 5/2000 |

(Continued)

OTHER PUBLICATIONS

U.S. Appl. No. 11/249,121, filed Oct. 11, 2005, Barrett et al.

(Continued)

*Primary Examiner* — Oleg Asanbayev
(74) *Attorney, Agent, or Firm* — Sheridan Ross P.C.

(57) ABSTRACT

An exemplary embodiment builds on the idea of presence and SIP messaging in conjunction with a profile comprising, for example, a lookup table and a rules module, to assist with one or more of reminders, actions, endpoint maintenance, availability, endpoint capabilities and session management. One exemplary embodiment provides a message-based notification system. SIP allows a user to associate themselves with a number of different User Agents (UAs). This means that a user may have a presence on more than one UA at any given time, e.g., soft phone, PDA, and workstation. One exemplary embodiment utilizes this fact in connection with monitoring and determining if a message is a trigger-type message to provide more timely and relevant notifications to users.

20 Claims, 2 Drawing Sheets

(56) References Cited

U.S. PATENT DOCUMENTS

| | | |
|---|---|---|
| 6,100,806 A | 8/2000 | Gaukel |
| 6,104,288 A | 8/2000 | Hopkins |
| 6,114,963 A | 9/2000 | Blake et al. |
| 6,173,053 B1 | 1/2001 | Bogart et al. |
| 6,192,122 B1 | 2/2001 | Flockhart et al. |
| 6,236,365 B1 | 5/2001 | LeBlanc et al. |
| 6,249,227 B1 | 6/2001 | Brady et al. |
| 6,265,963 B1 | 7/2001 | Wood, Jr. |
| 6,275,794 B1 | 8/2001 | Benyassine et al. |
| 6,310,549 B1 | 10/2001 | Loftin et al. |
| 6,362,778 B2 | 3/2002 | Neher |
| 6,449,358 B1 | 9/2002 | Anisimov et al. |
| 6,453,291 B1 | 9/2002 | Ashley |
| 6,456,964 B2 | 9/2002 | Manjunath et al. |
| 6,462,660 B1 | 10/2002 | Cannon et al. |
| 6,463,607 B2 | 10/2002 | Hartmann |
| 6,486,780 B1 | 11/2002 | Garber et al. |
| 6,504,838 B1 | 1/2003 | Kwan |
| 6,580,908 B1 | 6/2003 | Kroll et al. |
| 6,600,443 B2 | 7/2003 | Landt |
| 6,650,901 B1 | 11/2003 | Schuster et al. |
| 6,678,357 B2 | 1/2004 | Stumer et al. |
| 6,687,609 B2 | 2/2004 | Hsiao et al. |
| 6,687,668 B2 | 2/2004 | Kim et al. |
| 6,694,787 B1 | 2/2004 | Brown |
| 6,705,522 B2 | 3/2004 | Gershman et al. |
| 6,707,383 B2 | 3/2004 | Flaherty |
| 6,707,903 B2 | 3/2004 | Burok et al. |
| 6,757,359 B2 | 6/2004 | Stumer et al. |
| 6,778,084 B2 | 8/2004 | Chang et al. |
| 6,778,096 B1 | 8/2004 | Ward et al. |
| 6,804,329 B2 | 10/2004 | Geck et al. |
| 6,819,256 B2 | 11/2004 | Hampton |
| 6,825,767 B2 | 11/2004 | Humbard |
| 6,898,434 B2 | 5/2005 | Pradhan et al. |
| 6,907,238 B2 | 6/2005 | Leung |
| 6,989,750 B2 | 1/2006 | Shanks et al. |
| 6,990,328 B2 | 1/2006 | Crandall et al. |
| 6,992,587 B2 | 1/2006 | Maeda et al. |
| 6,996,402 B2 | 2/2006 | Logan et al. |
| 7,005,985 B1 | 2/2006 | Steeves |
| 7,027,564 B2 | 4/2006 | James |
| 7,030,731 B2 | 4/2006 | Lastinger et al. |
| 7,068,148 B2 | 6/2006 | Shanks et al. |
| 7,130,385 B1 | 10/2006 | Moon et al. |
| 7,148,803 B2 | 12/2006 | Bandy et al. |
| 7,171,357 B2 | 1/2007 | Boland |
| 7,317,716 B1 | 1/2008 | Boni et al. |
| 8,234,676 B2 * | 7/2012 | Klein et al. ............... 725/58 |
| 2002/0103636 A1 | 8/2002 | Tucker et al. |
| 2002/0173328 A1 | 11/2002 | Min |
| 2004/0002305 A1 | 1/2004 | Byman-Kivivuori et al. |
| 2004/0029558 A1 | 2/2004 | Liu |
| 2004/0134984 A1 | 7/2004 | Powell et al. |
| 2004/0142678 A1 | 7/2004 | Krasner |
| 2004/0203352 A1 | 10/2004 | Hall et al. |
| 2005/0007999 A1 | 1/2005 | Becker et al. |
| 2005/0048988 A1 | 3/2005 | Gentle et al. |
| 2005/0083911 A1 | 4/2005 | Grabelsky et al. |
| 2005/0136903 A1 | 6/2005 | Kashima et al. |
| 2005/0288000 A1 * | 12/2005 | Harris et al. ............... 455/418 |
| 2006/0017541 A1 | 1/2006 | Nguyen |
| 2006/0028352 A1 | 2/2006 | Fegan et al. |
| 2006/0158310 A1 | 7/2006 | Klatsmanyi et al. |
| 2006/0210034 A1 * | 9/2006 | Beadle et al. ............... 379/88.22 |
| 2006/0239200 A1 * | 10/2006 | Pirzada et al. ............... 370/252 |
| 2007/0124393 A1 | 5/2007 | Maes |
| 2008/0098060 A1 | 4/2008 | Boni et al. |
| 2009/0052365 A1 * | 2/2009 | Foti ............... 370/314 |

FOREIGN PATENT DOCUMENTS

| | | |
|---|---|---|
| EP | 1091307 | 4/2001 |
| EP | 1150236 | 10/2001 |
| JP | 2004/013789 | 1/2004 |
| WO | WO 2005/001669 | 1/2005 |
| WO | WO 2005/122534 | 12/2005 |

OTHER PUBLICATIONS

Alcatel-Lucent, http://www1.alcatel-lucent.com/doctypes/articlepaperlibrary/pdf/ATR2005Q1/T0503-Rich_presence-EN.pdf.

Nedergaard, Cisco Unified Presence Solutions, Tech Update 6/8 Feb. 2007, Cisco Systems Denmark, http://www.cisco.com/web/DK/assets/docs/Techupdatefeb2007kunder.pdf.

Niemi, "Session Initiation Protocol (SIP) Extension for Event State Publication", IETF RFC 3903, Oct. 2004, http://tools.ietf.org/html/rfc3903.

Roach, "Session Initiation Protocol (SIP)—Specific Event Notification", IETF RFC 3265, Jun. 2002, http://www.ietf.org/rfc/rfc3265.txt.

Rosenberg, "A Data Model for Presence", IETF RFC 4479, Jul. 2006, http://tools.ietf.org/html/rfc4479.

Rosenberg, "A Presence Event Package for the Session Initiation Protocol (SIP)", IETF RFC 3856, Aug. 2004, http://tools.ietf.org/html/rfc3856.

Rosenberg, "A Watcher Information Event Template-Package for the Session Initiation Protocol (SIP)", IETF RFC 3857, Aug. 2004http://tools.ietf.org/html/rfc3857.

Rosenberg, "An Extensible Markup Language (XML) Based Format for Watcher Information", IETF RFC 3858, Aug. 2004, http://tools.ietf.org/html/rfc3858.

Sugano, et al., "Presence Information Data Format (PIDF)", IETF RFC 3863, Aug. 2004, http://tools.ietf.org/html/rfc3863.

Sofia-SIP 1.12.9devel1, publication of Nokia, http://sofia-sip.sourceforge.net/refdocs/sip/group_sip_headers.html, accessed Dec. 22, 2008, 5 pages.

Background of the Invention for the above-captioned application (previously provided).

U.S. Appl. No. 10/810,459, Orbach.

U.S. Appl. No. 10/932,507, filed Sep. 1, 2004, Fegan et al.

Active Campus Tutorial by David Casteron dated Oct. 11, 2003, downloaded from http://activecampus-dev.ucsd.edu/ntutorial/main.htm on Apr. 12, 2005.

AIM, rfid.org, Searching for RFID Information, available at http://www.aimglobal.org/technologies/rfid, 3 pages, accessed Jun. 2, 2004.

Applied Generics Technical Report "NERO24 Mobile Location System (GSM Edition)," Version 1.0 (2004), pp. 1-27.

Avaya "Administrator's Guide for Avaya Communication Manager: vols. 1, 2, and 3," 555-533-506, Issue 7 (Nov. 2003), pp. 121, 129, 886, 889, 1169, 1193, 1555.

Avaya: Communication without Boundaries, Solving the Challenges of E911 Service with Avaya IP Telephony Networks, White Paper, Nov. 2002, Issue 1.1, 10 pages.

Cisco Data Sheet, Cisco Emergency Responder Version 1.1, Jul. 20, 2002, available at http://www.cisco.com/warp/public/cc/pd/unco/cer/prodlit/emerg_ds.htm, 7 pages.

Cisco Systems, Inc., Cisco Emergency Responder Version 1.1 (Oct. 2001), 5 pages.

Cisco, Cisco Emergency Responder, downloaded Oct. 3, 2005, available at http://www.cisco.com/warp/public/cc/pd/unco/cer/, 2 pages.

Comments of Nortel Networks, Before the Federal Communications Commission, May 28, 2004, pp. 1-22 with Appendices 1-4.

Dressen et al., Project Mayhem, available at http://www.cs.colorado.edu/upgrad/seniorproject/projects/projectmahhem.html, 2 pages, (2003)(Downloaded on Apr. 12, 2005).

EIA Telecommunications Industry Association, TIA Telecommunications Systems Bulletin: Telecommunications—IP Telephony Infrastructures—IP Telephony Support for Emergency Calling Service, TSB-146, Mar. 2003, 36 pages.

Ericsson, Location Based Services, available at http://www.ericsson.com/telecomreport/article.asp?aid=34&tid=tid=201&ma=1&msa=3, 3 pages, (Updated Oct. 3, 2002).

(56) References Cited

OTHER PUBLICATIONS

Khaled El-Maleh et al., "Comparison of Voice Activity Detection Algorithms for Wireless Personal Communications Systems," McGill University, Department of Electrical Engineering (1997), pp. 1-27.
Mobile in a Minute, available at www.mobilein.com/location_based_services.htm, 3 pages, (Downloaded on Apr. 12, 2005).
Newsweek, An Internet of Things—Is RFID the Mark of Satan . . . , available at http://msnbc.msn.com/id/3068871, 4 pages (Jun. 10, 2004)(Downloaded Jun. 2, 2004).
Nikos Doukas et al., "Voice Activity Detection Using Source Separation Techniques", Signal Processing Section, Dept. of Electrical Engineering, Imperial College, UK, four (4) pages; undated.
"Perimeter Security Sensor Technologies Handbook," available at http://www.nlectc.org/perimetr/full2.htm, 104 pages; printed Feb. 2, 2005.
RedSky Technologies, Inc.; "Welcome to RedSky's E-911 Business Watch" E-911 Business Watch, Issue 4 (Oct. 21, 2003), 5 pages.
RFID Journal, Frequently Asked Questions, Manufacturing, available at http://www.rfidjournal.com/article/articleview/207, 7 pages.
RFID, Tracking Everything, Everywhere, by Katherine Albrecht, available at http://www.stoprfid.org/rfid_overview.htm, 6 pages.
RFID, Wikipedia, the free encyclopedia, available at http://en.wikipedia.org/wiki/RFID, 10 pages (Updated Oct. 2, 2005).
Schulzrinne, "Providing Emergency Call Services for SIP-based Internet Telephony", Available at: http://www.iptel.org/info/players/ietf/location/draft-schulzrinne-sip-911- -00.txt, Jul. 2000, pp. 1-14.
The Denver Post, Bar Code Meets Its Match, Section C, (Jun. 3, 2004), 4 pages, accessed Oct. 5, 2005.
Time Online Edition, Global Business—The See-It-All Chip, available at http://www.time.com/time/globalbusiness/article/0,9171,1101030922-485764-3,00.html, 4 pages (Sep. 22, 2003).
Wired News, Radio ID Tags: Beyond Bar Codes, available at http://www.wired.com/news/technology/0,1282,52343,00.html, 4 pages (May 20, 2002).
WYSE, RFID, available at http://searchnetworking.techtarget.com/sDefinition/0,,sid7_gci805987,00.html, 3 pages (Downloaded Oct. 3, 2005).
WYSE, RFID, available at http://searchnetworking.techtarget.com/sDefinition/0,,sid7_gci805987,00.html, 2 pages (updated Jan. 16, 2004).

\* cited by examiner

Fig. 3

SIP PRESENCE BASED NOTIFICATIONS

FIELD OF THE INVENTION

An exemplary embodiment of the present invention is directed toward communication technologies. More specifically, an exemplary embodiment is directed toward detecting one or more SIP messages, and taking an action at least based thereon.

BACKGROUND

"Presence" is well known in the telecommunications industry. Presence and presence information relate to a person having multiple devices with multiple communication paths and a user's preference or preferred device of availability. "Presence information" typically refers to any information associated with a network node and/or endpoint device, such as a communications device, that is in turn typically associated with a person or entity. Examples of presence information include registration information under the Session Initiation Protocol (SIP), information regarding the accessibility of the endpoint device, the endpoint(s) telephone number or address, the recency of use of the endpoint device by the person, recency of authentication by the person to a network component, and the preferences of the user, such as contact mode preferences or profiles, such as the communication device to be contacted for specific types of contacts or under specific actual scenarios or presence contacts, contact time preferences, impermissible contact types and/or subjects, such as the subjects about which the person does not wish to be contacted, parties who must not be contacted, i.e., a do not call if you are not calling on behalf of a specific person or entity, and parties who can contact at any time, e.g., "I will accept a call from the head of the company regardless of what I am doing."

Typically, the presence information is communicated and updated via one or more SIP-based messages exchanged, for example, between one or more endpoints and/or one or more application servers.

Presence information can be user configurable, i.e., the user can configure the number and type of communication and message devices (endpoints) with which they can be contacted and define profiles that govern the communication and message options presented to the incoming contact or in specified factual situations or sets of facts. By identifying a pre-defined set of facts, a profile can be accessed and followed to direct the contact to the user/preferred device.

SUMMARY

Session Initiation Protocol is a signaling protocol that can be used for establishing sessions in an IP network. The session can be a simple two-way telephone call, or, for example, could be a multi-party multi-media conference session. SIP protocols are well known and allow the ability to establish and break-down sessions in a host of different service options such as voice-enriched, e-commerce, web page click-to-dial, instant messaging, IP Centrex services, and the like. SIP messaging is also used in conjunction with presence monitoring to provide a telecommunications architecture with endpoint status. As will be apparent from the discussion of the exemplary embodiments of the invention described herein, the systems and methods of this invention can use SIP protocols and associated SIP servers, such as presence servers and databases(s), to implement the functionality, actions and messaging described herein.

SIP messaging provides the ability to prepare and provide notifications to people based on their location. However, the rules used to trigger notifications are typically based on a user's physical location (i.e., GPS based notification systems, RFID based access control systems, etc.) These triggering events may not adequately and timely provide a notification to a user because they are based on spatial relationships, which may be ambiguously defined and therefore not as useful.

An exemplary embodiment of the present invention builds on the idea of presence and SIP messaging in conjunction with a profile comprising, for example, a lookup table and a rules module, to assist with one or more of reminders, actions, endpoint maintenance, availability, endpoint capabilities and session management.

One exemplary embodiment of the present invention provides a message-based notification system. SIP allows a user to associate themselves with a number of different User Agents (UAs). This means that a user may have a presence on more than one UA at any given time, e.g., soft phone, PDA, and workstation. One exemplary embodiment of this invention utilizes this fact in connection with a reminder system to provide more timely and relevant notifications to users. Consider the following exemplary scenarios.

Suppose that a user is logging out of his/her IM application on the computer, the messaging used to complete the logout procedure may be dual-functioned to initiate the generation of a reminder message or at least invoke a set of reminder message rules. Thus, a user may have a reminder setup for when they leave the office. A reminder generated in response to seeing that the user is logging out of the IM application will likely get to the user sooner than a reminder generated in response to seeing that the user is physically leaving his/her office. Therefore, if the reminder pertained to getting something from the office, less time is wasted because the user gets the reminder more quickly than if their location was used as the triggering event.

Suppose that a user is checking their voicemail. That user may have generated a reminder to call back a client to follow up on an order. When the person logs into their voicemail account the messaging used to log the user in may be utilized to retrieve/generate the call-back reminder. Then, when the user attempts to log out from the voice mail system, the reminder may be transmitted to the user either at the phone they are on or some other UA as determined by the user's preferences. This allows the reminder to be sent to the user when they are (1) not busy on the phone but (2) near the phone and in the mode of making calls. This is more convenient than providing a reminder to call someone back as they are leaving or entering the office. The reminder may also be generated and sent to the user at another UA (e.g., their cell phone) if the call is going to be a personal call rather than a business call or a long-distance call rather than a local call. The message type and origination/destination of the message may be used to determine which rule set is invoked Extensions to the invention may include utilizing GPS information to further identify the type of message that should be provided to a user. This may allow the system to couple location information with the message-based triggering to further refine which and how the message is provided to the user, as well as define the content of the message.

For example, in a commercial repair service environment, SIP messages, e.g., presence information, GPS information and schedule information (such as which repairs are scheduled for a given day and what parts are need for each repair) for a given time period can be utilized to provide more timely and relevant notifications/reminders to users. These notification/reminders could be dynamically assembled based on information aggregated from one or more schedules, email, calendars, tasks, contacts, GPS coordinates associated with the scheduled events and expert system input.

Further extensions to the invention include allowing third-parties to generate notifications/reminders for other users. As one example, when two parties are on a phone call, one of the parties may create a reminder for the other party (e.g., an action item identified during the phone call). That reminder may be created and queued for the counterparty. Transmission of the SIP BYE message from one device to the other device may trigger the transmission of the action item reminder. Permissions and privileges may also be used to identify who can and who cannot create reminders for other persons.

Information such as the permissions and privileges, as well as parameters regarding certain action items can be stored in one or more profiles associated with one or more of an endpoint and a user. An exemplary profile can be developed by monitoring communications with a person and recording information such as what did the user do on receipt of a certain type of information, how a user establishes their reminders, how a user prefers to be contacted, e.g., mobile phone, work phone, home phone, etc., and at what times.

Presence systems can also be used in conjunction with the present invention and can assist in determining availability e.g., if Windows® Outlook indicates a person is not online, they are most likely not at their desk and will not be able to see a task reminder displayed on the desktop. An exemplary feature of this invention could recognize a message between the user's desk phone and an application server to call-forward communications to a PDA. Based on this message, the system could automatically forward the task reminder to the call forwarded device.

"Call", "communication" or "contact" as used herein is indicative of a connection or request for connection between two or more communication devices or endpoints. As will be appreciated, contacts could be of various types and forms, such as wireline or wireless, circuit and packet-switched voice contacts, e-mail, instant messaging, faxes, video messages, paging signals, VoIP sessions, chat sessions, video conferences, multimedia communications, multimedia multi-party messages, cross-media messages, multimedia conference sessions, or in general any type or form of communication over any type of media. Moreover, availability intelligence can be combined with presence and predictive capabilities, where availability intelligence refers to processed, e.g., compiled, cross-referenced and/or filtered, presence information or meta-information. Furthermore, as is known, policy rules associated with a callee's name space can be mapped against one or more of the presence information, intelligence information, or the like, and utilized in conjunction with the present invention to at least assist with determining an appropriate action to take (if any).

An exemplary aspect of the invention is thus related to establishing communications between parties.

More specifically, an exemplary aspect of the invention relates to monitoring messages used to establish, maintain and break-down communications sessions.

More specifically, an exemplary aspect of the invention relates to monitoring messages used to establish, maintain and break-down communications between parties.

Still further aspects of the invention relate to detecting certain types of monitored messages.

Still further aspects of the invention relate to performing an action based on the certain types of detected message(s).

Still further aspects of the invention relate to using presence information and the certain types of detected message(s) to determine an action.

Still further aspects of the invention relate to using profile information and certain types of detected message(s) to determine an action.

Still further aspects of the invention relate to using one or more of artificial intelligent, expert systems, lookup tables, rules and profile information to determine an action.

Additional aspects of the invention relate to identifying and rerouting and/or replicating certain types of messages.

Additional exemplary aspects of the invention relate to using an xml API or command module to assist with the performing of an action.

Additional aspects of the invention are suited to implementation in a Back-to-Back User Agent (B2BUA) where the B2BUA acts as a User Agent server on one side and as a User Agent client on the other (back-to-back) side. The B2BUA is thus particularly well suited to receive session messages. The basic implementation of a B2BUA is defined in RFC 3261 and can provide call management, network interworking, hiding of network internals (private addresses, network topology, etc.) and codec translation between two call legs. Because it maintains call state for all SIP calls it handles, message monitoring, detection and action initiation can be performed by a single endpoint.

These and other features and advantages of this invention are described in, or are apparent from, the following detailed description of the exemplary embodiments. The embodiments and configurations herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

Exemplary embodiments of the invention will be described in detail, with reference to the following figures wherein.

DETAILED DESCRIPTION

Exemplary embodiments of this invention will be described in relation to communication, communication detection and action determination. However, it should be appreciated that in general, the systems and methods of this invention will work well for any type of communication in any communication environment using any communication protocol(s).

The exemplary systems and methods of this invention will be described in relation to telecommunications systems, and associated telecommunications hardware, endpoints, software and/or communication channels. However, to avoid unnecessarily obscuring the present invention, the following description omits well-known structures, network components and devices that may be shown in block diagram form, are well known, or are otherwise summarized.

For purposes of explanation, numerous details are set for the in order to provide a thorough understanding of the present invention. It should be appreciated however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet or within a dedicated secure, unsecured and/or encrypted system. Thus, it should be appreciated that the components of the system can be combined into one or more devices, such as a PBX, application server, or communications device, associated with an ACD (Automatic Call Distribution) system, or the like, or collocated on a particular node of a distributed network, such as an analog and/or digital telecommunications network, a circuit-switched network and/or a packet-switched network. As will be appreciated from the following description, and for reasons of computational efficiency, the components of the system can be arranged at any location within a distributed network without affecting the operation of the system. For example, the various components can be located within a PBX, at one or more users' premise, or some combination thereof. Similarly, one or more functional portions of the system could be distributed between a telecommunications device(s) and an associated computing device.

Additionally, the communications between the endpoints can at least be from one or more of a telephone, cell phone, instant messaging system, laptop, personal computer, personal digital assistant, text messaging system, e-mail, fax, IP phone, application server(s), or in general any known or later developed system or means for communication.

Session Initiation Protocol or SIP, which is a simple signaling/application layer protocol for data network multimedia conferencing and telephony, can also be used with the present invention to provide, for example, a means for determining a users actions and assist with providing presence awareness in a communication network. Although other protocols are equally supportive of presence concepts, SIP provides an illustrative basis for the present invention.

It should also be appreciated that various links, including any communications channels and the various links 5, connecting the elements, can be wired or wireless links, or any combination thereof, or any other well-known or later developed element(s) that is capable of supplying and/or communicating data to and from the connected elements. The term module as used herein can refer to any known or later developed hardware, software, firmware, fuzzy logic, expert system, neural network or combination thereof that is capable of performing the functionality associated with that element. The terms determine, calculate and compute and variations thereof, as used herein are interchangeable and include any type of methodology, process, mathematical operation or technique. Furthermore, it is to be noted that the term "a" or "an" entity refers to one or more of that entity. As such, the terms "a" or "an", "one or more" and "at least one" can be used interchangeably herein. It is also to be noted that the terms "comprising", "including" and "having" can be used interchangeably.

Also, while the flowcharts have been discussed and illustrated in relation to a particular sequence of events, it should be appreciated that changes, additions, and omissions to this sequence can occur without materially affecting the operation of the invention.

As will be appreciated, the communication system can also comprise other well known components which will not be described herein in detail. For example, the communication system can further include one or more telephony switches/media servers that can be of any architecture for directing communications to one or more communications devices. The network(s) (not shown) can typically include proxies, registers, switches and routers that are well known. Incoming contacts or communications can be from communication devices, e.g., endpoints, associated with a caller/callee or can be any device or devices suitable for communication over the network to which they are connected. For example, the communication devices can be any wired or wireless device such as an IP hard phone, IP soft phone, personal digital assistant, Blackberry®, Treo®, personal computer or PC, laptop, mobile phone, traditional PSTN phones, cellular phones, or any combination thereof.

Figure 1:
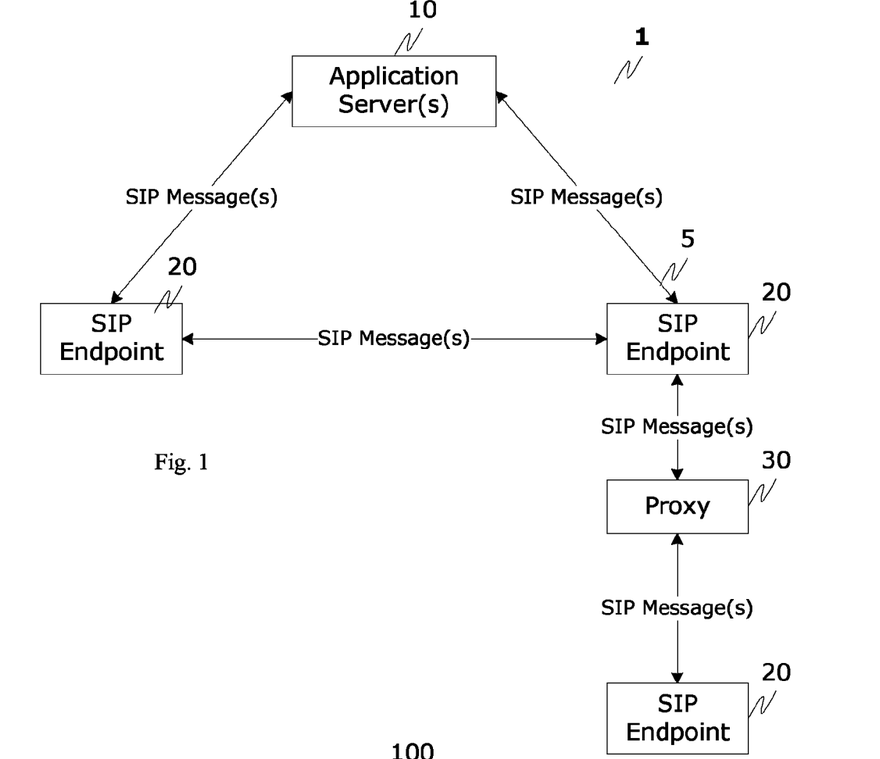
FIG. 1 illustrates an exemplary communication system according to this invention.

The exemplary communications system 1 includes one or more SIP endpoints 20, one or more application servers 10, and optionally a proxy server 30, all connected by one more links and/or networks (not shown). Communications sessions between the one or more endpoints 20 and application servers 10 are established, maintained, and terminated through the use of various SIP messages between the appropriate devices. Typical SIP messages between the devices include REGISTER, INVITE, ACK, CANCEL, BYE and OPTIONS.

The SIP messages are either requests from a server or client or responses to a request. The above-mentioned six types of requests are broken down as follows. INVITE indicates a user or service is being invited to participate in a call session. ACK confirms that the client has received a final response to an invite request. BYE terminates a call and can be sent by either the caller or the callee. CANCEL cancels any pending searches but does not terminate a call that is already been accepted. OPTIONS allows the querying of the capabilities of one or more servers and REGISTER registers the address listed in the "To:" header field with a SIP server.

Figure 2:
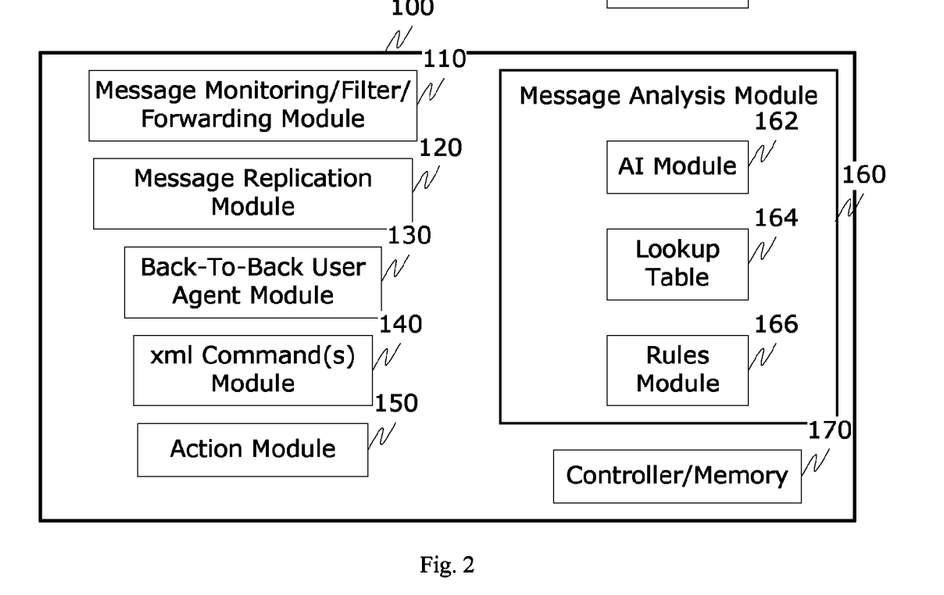
FIG. 2 illustrates exemplary componentry that can be associated with one or more endpoints according to this invention.

In accordance with an exemplary embodiment of this invention, it is these SIP messages that are exchanged between the various communication endpoints that trigger a corresponding action. More specifically, and in relation to FIG. 2, illustrated is an exemplary SIP Message Action Module (SMAM) 100 according to an exemplary embodiment of this invention. In particular, the SMAM 100 includes a message monitoring, filter and forwarding module 110, a message replication module 120, a back-to-back user agent module 130, XML command module 140, action module 150, message analysis module 160 and controller/memory 170. The message analysis module 160 further includes an artificial intelligence module 162, on or more lookup tables 164, and a rules module 166.

In general, the various components and modules illustrated in FIG. 2 cooperate to detects certain types of messages between certain endpoints, and then, if appropriate, decide and take an action based on one or more rules, information, lookup table information, artificial intelligence and an expert system. More specifically, the message monitoring, filter and forwarding module 110 monitors one or more messages to and from an endpoint. Each message can be analyzed and correlated to, for example, information in the look up table 164, to determine if that message has an associated action. Messages, for which no associated action is identified, can be ignored.

There are a number of options for when a message that has an associated action is detected. In accordance with one exemplary embodiment, the actionable or trigger-type message can be forwarded to a specific destination, such as an application server. Alternatively, or in addition, and in cooperation with the message replication module 120, the trigger-type message can be duplicated and forwarded to a specific destination, such as an application server.

For example, while the SMAM 100 is illustrated as including all the various modules to implement the basic functionality of this invention, it should be appreciated that the various modules could be processor intensive and therefore offloaded from a simple endpoint to a more processor-centric device, such as an application server. Therefore, according to one exemplary embodiment of the invention, the message monitoring, filter and forwarding module 110 could be located on a "lite" endpoint along with the message replication module 120, which then forwards a trigger-type message to a message analysis module 160 located in, for example, an application server 10. An endpoint, such as a Blackberry®, may have sufficient processing and memory capabilities to house virtually all of the functionality provided in the SMAM 100. In this case, the message replication may not be needed and the message monitoring, filter and forwarding module 110 can cooperate directly with one or more of the message analysis module 160 and action module 150 located on the device itself.

The back-to-back user agent module 130 is illustrated as an optional agent and is particularly well suited to cooperate with the message monitoring, filter and forwarding module 110 since it handles communications as both a client and server.

In operation, the message monitoring, filter and forwarding module 110 monitors messages between one or more endpoints. The monitoring can be a single message or a sequence of messages, such as the sequence of messages that are used to establish, maintain and break-down a SIP-based communication session. As discussed, the messages are filtered such that only messages identified as being a triggering-type message are forwarded to the message analysis module 160 to determine if there is an action associated with that message, or a particular sequence or combination of messages. Assuming the message(s) is of a type that is a triggering-type message, the message analysis module 160 receives the message and analyzes the message including one or more of the message type, source information, destination information, and optionally one or more of presence information, and user(s) profile information associated with any one or more of the endpoints and users associated therewith. This analysis can be based on one or more of an artificial intelligence analysis of the message in cooperation with the artificial intelligence module 162, a lookup table approach 164 and a rule based approach in conjunction with the rules module 166. The analysis module 160 can also cooperate with the controller/memory 170 and access a user profile (not shown) to assist in determining whether an action is associated with the trigger-type message. Information that can also be included to assist with the analysis by the message analysis module 160 includes the user location, SIP URI, the availability of the user, the availability of other users in the communication session, session setup information, capabilities of the one or more endpoint devices associated with this session, session management information, and in general any information associated with a communications session.

In addition to the above, the message analysis module 160 can also look to further information such as calendar information, e-mail client information, task information, schedule information, and in general, any information available to assist with determining what is the appropriate action to take based on the trigger-type message.

As an example, the artificial intelligence module 162, upon receipt of a trigger-type message first analyzes the source and destination information associated with the message. The artificial intelligence module 162 can also dip into associated applications and determine related actionable items based, for example, on a correlation between one or more of the source and destination information to that actionable item. For example, if there is a task in a users e-mail application associated with the destination the user called, (for example, the correlation can be made between the e-mail address and the SIP URI) this task could be displayed to the calling party to act, for example, as a reminder that there is an open actionable item. The artificial intelligence module 162 can also look at, for example, historical information associated with the parties in the communication session to determine if the user accepted or rejected the proposed actionable item. As discussed hereinafter, a prompt can be presented to the user providing them with information regarding the type of action(s) that the message analysis module 160 determined was appropriate, and whether or not the user wants to proceed with that action.

In accordance with an alternative operation of the message analysis module 160, the message can be compared to a lookup table 164 to see if there is a corresponding action. For example, if a user sends a BYE message to log-out of their computer and office voicemail, the lookup table can indicate that all messages should be forwarded to a mobile messaging device upon receipt of this type of message. As yet another example, if a user sends a redirect message to, for example, their application server, the lookup table 164 can compare the destination of the redirect to, for example, information of the users profile, and recognize that the redirected destination device is not HTML enabled, and forward all communication(s) to the device in an SMS protocol.

As yet another example, the user editable rules module 166 can include one or more pre-defined or user-created rules that corresponded to certain trigger-type messages. These rules can be of a high level, for example, directed toward a specific message type alone, or can be more granular in nature, such as they only apply to a specific message type with a specific sender, recipient and/or SIP URI or a specific message header(s) or information contained within a particular message header. Additional details of known SIP headers are described in Sofia-SIP 1.12.9devel1, a publication of Nokia, the entire contents of which are hereby incorporated herein by reference and are also available at http://sofia-sip.sourceforge.net/refdocs/sip/group_sip_headers.html.

Once a determination has been made that an action is appropriate based on the trigger-type message, the message analysis module 160 cooperates with one or more of the action module 150 and controller/memory 170 to perform or initiate the action. As discussed, these actions can includes reminders, communication rerouting, prompting, updating presence information, or in general any action item. Optionally, and instead of the action being automatically performed, once it is determined by the message analysis module 160 that a message is appropriate, the action module 150 can query the user and present to them the determined action and ask for confirmation as to whether this action should be performed. This query can be provided graphically, audibly or via a message, such as an SMS message to the user. For example, based on the endpoint associated with the user at the particular time an action is determined to be appropriate, the query can be customized based on the specific capabilities of that user's endpoint. In addition, an interactive voice response service (not shown) could also be used to interact with the user to determine if the action should be performed, and further provide the ability for the user to customize the action based on the selection of certain parameters. Additionally, whether the action should be performed automatically or not could be stored in a profile or associated with the rule or lookup table.

The action module 150 can also cooperate with the XML command module 140 send an XML API as well suited for use with this invention.

In addition to reviewing SIP messages, the analysis module could optionally dip into one or more of communication history, profile information, history information, and the like, as well as into any other source(s) of information, and use this information to assist with action determination. In general, information from any source can be assembled and used in conjunction with the message analysis module to assist in determining an action. The availability of this information could optionally be user selectable, as well as governed by one or more rules, privacy filters and/or other individual filtering criteria.

Figure 3:
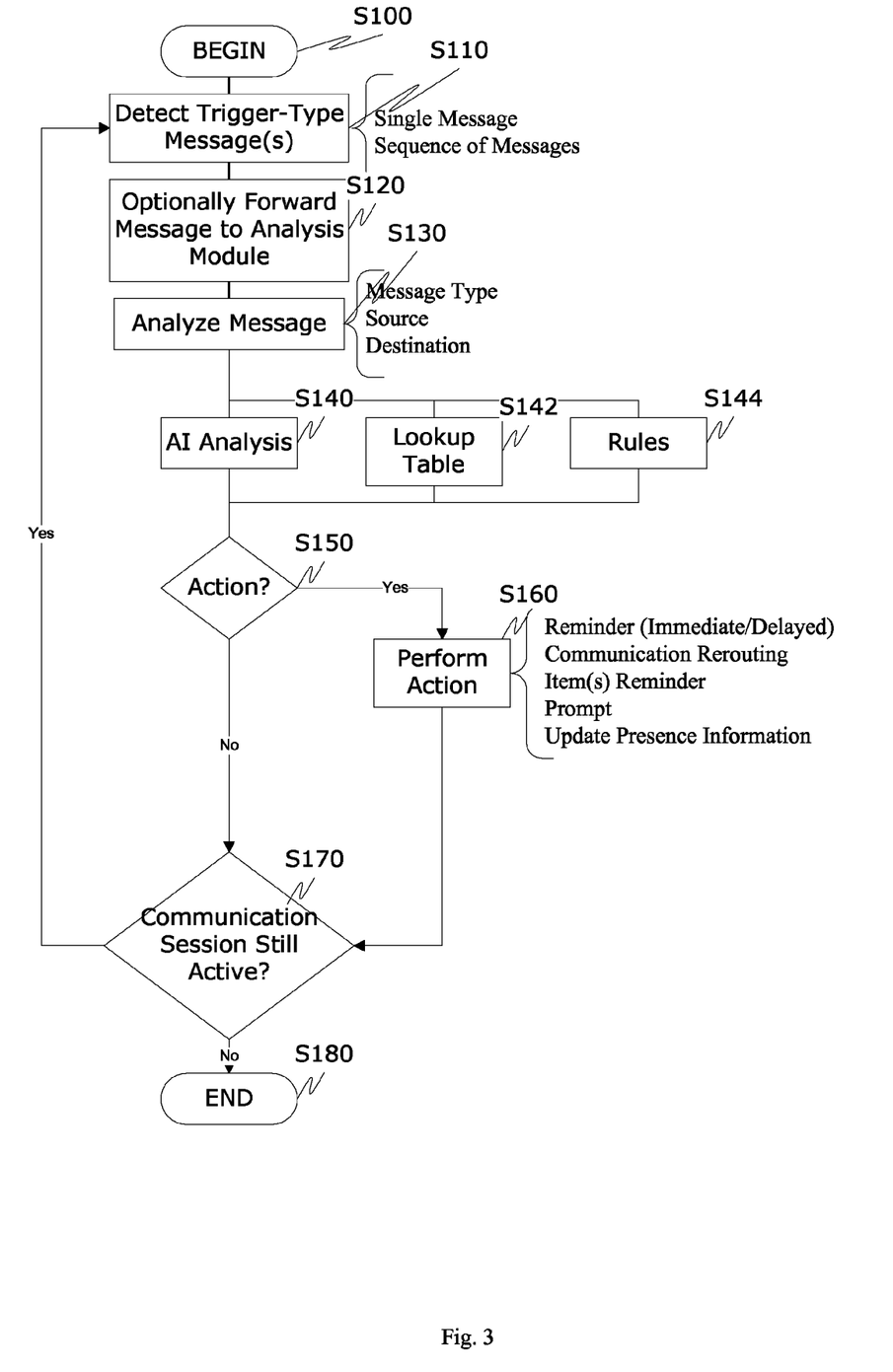
FIG. 3 outlines an exemplary method for SIP based notifications according to this invention.

Table 1 below illustrates numerous types of trigger-type messages and exemplary associated actions. This table should not be considered as complete nor exhausted, and merely provides a handful of very simple applications of exemplary embodiments of the present invention.

formed. Additionally, in accordance with an optional embodiment, the user is queried to approve the determined action before the action is taken. Control then continues to step S170.

In step S170, a determination is made whether the communication session is still active. If the communication is still active, control jumps back to step S110. Otherwise, control continues to step S180 where the control sequence ends.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

TABLE 1

| Message Type | To/From | Action |
| --- | --- | --- |
| BYE | From Party A to Party B | View Next Meeting Item from Calendar, If Current, Start Session |
| INVITE | To Pat from Bob | View Reminders, If Reminder to send Pat Agenda, Forward Agenda in email |
| BYE | To All on Teleconference | Compose Follow-up email addressed to Teleconference participants (use SIP URI to email address correlator) |
| CANCEL | To A from IP Phone | Initiate Alternate Contact Application (e.g., email) |
| REGISTER | To Application Server (Detected user now on email capable device) | FORWARD email to device |
| INVITE to X + ACK from X | | Start Web Collaboration Tool |
| INVITE | To Appointment | Pull Appointment from Calendar, Reminder for Type of Work, check GPS, determine closest parts warehouse |
| BYE + REGISTER | BYE To Application Server and REGISTER to Mobile | FORWARD all communications to Mobile |
| INVITE | To A, B, C and D | Check if any new emails from A, B, C and D, open new emails |
| ACK | From A, B and C (not D) | Send Meeting Invite to D |
| INVITE | To B (Office) | Obtain Presence of B, Send new INVITE to Cell |
| BYE | To Application Server (Voicemail) | Send Reminder |

FIG. 3 outlines an exemplary method of SIP presence based notifications according to this invention. In particular, control begins in step S100 and continues to step S110. In step S110, one or more trigger-type message are detected. Next, in step S120, and if the message is a type that should be forwarded to the analysis module, the message is forwarded thereto. Then, in step S130, the message is analyzed. The analysis of the message can include one or more of the message type, source information, destination information, and in general, any information related to the message. The analysis of the message can be in conjunction with one or more of an artificial intelligence based analysis (S140), a lookup table-based analysis (S142) and a rules based analysis (S144). Control then continues to step S150.

In step S150, a determination is made whether an action should be performed. If an action should be performed, control continues to step S160. In step S160, the action is per- The above-described system can be implemented on wired and/or wireless telecommunications devices, such as a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present invention, systems and methods for initiating an action based on a detected message. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for detecting a message in a communications environment including one or more endpoints associated with a first user comprising:
associating, by a processor, a pre-defined user action, configured by the first user and defining at least one action to be performed, with a presence-based trigger-type message, wherein the presence-based trigger-type message is a Session Initiation Protocol (SIP) type message including at least one of a REGISTER, INVITE, ACK, CANCEL, and BYE message;
detecting, by a processor, a SIP message generated by a communications device being operated by the first user and determining that the SIP message is the presence-based trigger-type message;
analyzing, by a processor, the SIP message, wherein the analysis detects that the SIP message is associated with the first user, the pre-defined user action is configured for the first user, and a notification user presentation for the pre-defined user action is configured by the first user; and
in response to determining that the SIP message is the presence-based trigger-type message and when the at least one action to be performed is an open actionable item, initiating by a processor, an action within the communications environment to at least notify the first user of the open actionable item via the notification user presentation for the pre-defined user action configured by the first user.

2. The method of claim 1, further comprising querying a user as to whether the pre-defined user action should be completed.

3. The method of claim 1, wherein determining that the SIP message is the presence-based trigger-type message includes determining at least one of source and destination information associated with the SIP message, and wherein one or more of artificial intelligence, a lookup table, and rules are used in detecting that the SIP message is associated with the first user, the pre-defined user action configured by the first user, and a notification user presentation for the pre-defined user action configured by the first user.

4. The method of claim 1, further comprising one or more of forwarding and replicating the presence-based trigger-type message.

5. The method of claim 1, wherein the determining step is based on one or more of the SIP type message, source information, destination information, and related messages.

6. The method of claim 1, wherein the action within the communications environment is one or more of a reminder, communication rerouting, prompt, update to presence information, and communication initiation.

7. The method of claim 1, further comprising detecting a plurality of SIP messages and determining whether the plurality of SIP messages are equivalent to the presence-based trigger-type message.

8. The method of claim 1, further comprising determining if a communication session is still active.

9. The method of claim 1, further comprising consulting one or more of presence information and profile information to determine whether the SIP message is the presence-based trigger-type message.

10. The method of claim 1, wherein the SIP message is communicated between one or more of an endpoint, another endpoint and an application server.

11. A non-transitory computer-readable storage media having instructions stored thereon that when executed by a processor perform the steps in claim 1.

12. The method of claim 1, wherein the notification is provided to the first user at a device associated with the first user.

13. A Session Initiation Protocol (SIP) message action system for detecting a message in a communications environment including one or more endpoints associated with a first user comprising:
at least one memory including processor-executable instructions stored thereon as modules, the modules comprising:
a message monitoring module that detects a SIP message generated by a communications device being operated by the first user, wherein the SIP message includes at least one of a REGISTER, INVITE, ACK, CANCEL, and BYE message, wherein the SIP message is associated with a pre-defined user action, configured by the first user and defining at least one action to be performed, and determines that the SIP message is a presence-based trigger-type message; and
a message analysis module that analyzes the SIP message, wherein the analysis is detects that the SIP message is associated with the first user, the pre-defined user action configured by the first user, and a notification user presentation for the pre-defined user action configured by the first user, and in response to determining that the SIP message is the presence-based trigger-type message and when the at least one action to be performed is an open actionable item, an action module initiates an action within the communications environment to at least notify the first user of the open actionable item via the notification user presentation for the pre-defined user action configured by the first user; and the processor in communication with the memory, wherein the processor is configured to execute the modules.

14. The system of claim 13, wherein the message analysis module includes a lookup table.

15. The system of claim 13, wherein the determination is based on one or more of a message type, source information, destination information, and related messages.

16. The system of claim 13, wherein the action within the communications environment is one or more of a reminder, communication rerouting, prompt, update to presence information, and communication initiation.

17. The system of claim 13, wherein the message monitoring module detects a plurality of SIP messages and determines whether the plurality of SIP messages are equivalent to the presence-based trigger-type message.

18. The system of claim 13, wherein the message monitoring module further determines if a communication session is still active.

19. The system of claim 13, wherein one or more of presence information and profile information are consulted to determine whether the SIP message is the presence-based trigger-type message.

20. The system of claim 13, wherein the SIP message is communicated between one or more of an endpoint, another endpoint and an application server.

* * * * *